Aug. 26, 1958 L. DICKENS 2,849,017
INFLATION VALVE FOR PREVENTING UNAUTHORIZED DEFLATION OF TIRES
Filed Dec. 17, 1954
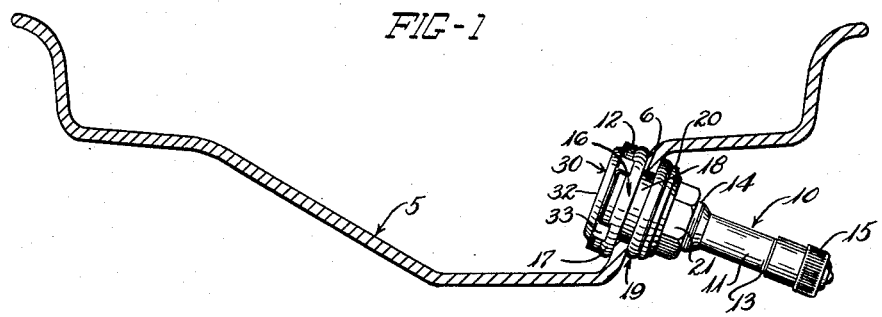
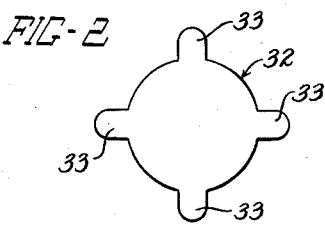
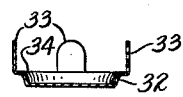
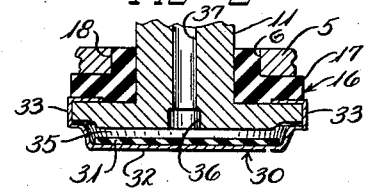
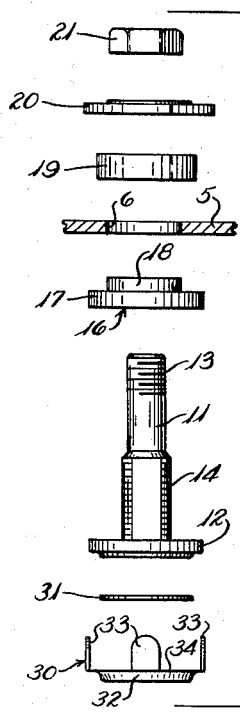
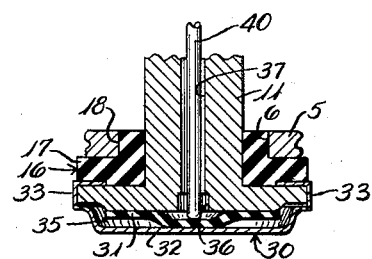
INVENTOR.
LESLIE DICKENS
BY W. A. Fraser
ATTY.

United States Patent Office 2,849,017
Patented Aug. 26, 1958

2,849,017

INFLATION VALVE FOR PREVENTING UNAUTHORIZED DEFLATION OF TIRES

Leslie Dickens, Eureka, Mo., assignor to The Firestone Tire & Rubber Company, Akron, Ohio, a corporation of Ohio Application December 17, 1954, Serial No. 475,917

1 Claim. (Cl. 137—223)

This invention relates to tire inner tube type valves used to conduct inflationary air to and from a tubeless pneumatic vehicular tire. Such valves, when used with tubeless tires, are commonly attached in fluid-tight relation with the tire rim at the rim valve hole.

Tire manufacturers that sell tires on the basis of the mileage the tires run and the companies that operate large taxi, bus or truck fleets, who buy tires on such mileage basis, are confronted with the problem of maintaining the proper air pressure in the tires. As is well known, the mileage received from tires run under-inflated is substantially less than from tires run properly inflated. The experience of said fleet operators has established that many drivers will disregard instructions and partially deflate the tires on vehicles they are driving. This deflation is done by simply pressing on the valve deflator pin until enough air has escaped to suit the driver's purpose, which is to produce a softer ride than proper tire inflation gives.

For many years tire manufacturers and said fleet operators have unsuccessfully sought an answer to this problem of loss of tire mileage from unauthorized deflating of tires.

It is an object of the present invention to solve the problem of unauthorized deflation of tires by simple inexpensive means attached to the base end of the inflating valve stem, said means permitting unobstructed inflation and preventing deflation through the valve, said means being inaccessible for deflation except by demounting the tire.

Other objects and advantages of the invention will become apparent from the following description taken in conjunction with the accompanying drawing.

In the drawing:

Fig. 1 is a sectional view of a tire rim showing an inflating valve stem embodying the present invention associated with said rim in operative relation therewith;

Fig. 2 is a plan view of a blank of thin metal before it is stamped to a predetermined shape preparatory to being attached to the base of said stem;

Fig. 3 is a side view of the blank shown in Fig. 2 as it appears after being formed to a shape adapted for attachment to the base portion of said valve;

Fig. 4 is an exploded view of the valve stem shown in Fig. 1 and its associated parts including a fragment of the rim;

Fig. 5 is an enlarged fragmentary sectional view of Fig. 1 illustrating the relative positions the elements shown in Fig. 4 occupy in their final assembly and during inflating of a tire mounted on said rim; and Fig. 6 is the same as Fig. 5 except the relative position of a gasket of a check valve is shown as it would appear if an elongated object were passed into the other end of the valve stem and pressed against said diaphragm in an effort to deflate a tire.

Referring to Figs. 1 and 4, it will be seen that a valve designated generally as 10 is attached to tire rim 5 at a rim valve hole 6. Valve 10 comprises a barrel 11, base 12, externally threaded end portion 13 opposite base 12, an enlarged externally threaded barrel portion 14 and an embossed annular table formed on the axially outer end of said base. A dust cap 15 is threaded upon end 13 of stem 10. It is to be understood that said externally threaded end 13 is also internally threaded and receives in threaded relation tire inner tube valve insides which function in the usual manner of tire inner tube valve insides relative to barrel 11 to permit tire inflationary air to pass through said barrel and rim into a tire mounted on said rim.

Stem 10 has associated therewith the usual elements presently being used commercially to attach valve stems to tubeless tire rims. These attachment elements include a rubber washer 16 which washer has a base portion 17 that is substantially equal to the base 12 of the valve stem and a reduced portion 18. Washer 16 has a central hole therethrough of a size so the washer fits about barrel portion 14.

Portion 18 extends axially outwardly of the rim into rim valve hole 6. A rubber washer 19 fits around barrel portion 14 and contacts the outer surface of rim 5 at said rim valve hole. A metal washer 20 is disposed on stem 10 in contact with washer 19 and a nut 21 is in threaded relation with portion 14 in contact with washer 20 all as shown by Fig. 1.

An important feature of the present invention is an auxiliary valve, referred to generally as 30, attached to the base 12 of valve 10. Valve 30 comprises a thin disk 31 preferably composed of rubber or rubber-like material housed in a chamber 35 between the base 12 of valve 10 and a housing 32 attached to base 12. Housing 32 is preferably composed of thin brass stamped in the form of a hollow round pan of a width somewhat less than the width or diameter of base 12. Housing 32 has lugs 33 turned over the edge of base 12 and extending under washer 16 as shown by Figs. 5 and 6 of the drawing; the lugs 33 are so turned over the edge of base 12 that the edge of the housing referred to as 34 is spaced a short distance from base 12 so that air during tire inflating can pass freely into and from said housing. As will best be seen by reference to Fig. 5 the disk 31 is of a thickness relative to the depth of chamber 35 that when said disk is in flat contact with the bottom of the pan of housing 32, as is the case during inflating of a tire, that air may pass freely from valve 10 through valve 32. In the event valve 10 is manipulated to start deflation of a tire mounted on rim 5 through a passageway 37 through barrel 11, then the movement of air through chamber 35, of valve 32, causes the valve or disk 31 to contact the base 12, and thereby close the entrance 36 of the passage 37 making deflation impossible.

The assembly shown in Fig. 1 is made by stamping out the housing blank 32 from a thin sheet of brass or other material found satisfactory. This blank is then form-stamped to the pan form illustrated in Fig. 3 after which the thin gasket 31 is placed in the pan of housing 32 and the lugs 33 turned over the edge of valve base 12 so as to attach housing 32 thereto with the edge 34 of said pan spaced from base 12 as shown in Fig. 5. Next gasket 16 is passed onto barrel 11 and pressed down against base 12 and then the capped end of barrel 11 is passed through rim valve hole 6 until reduced portion 18 of gasket 16 enters rim valve hole 6 and base portion 17 contacts the inner surface of said rim adjacent the rim valve hole. The next steps are to pass gasket 19 onto barrel 11 until it contacts said tire rim and then rigid washer 20 against gasket 19, after which nut 21 is run down on the threads of barrel portion 14 until the gaskets 16 and 19 are clamped firmly against rim 5 adjacent said valve stem hole thereby providing an air-tight attachment of valve 10 to rim 5.

When the assembly shown in Fig. 1 is used by the operators of large taxi, bus or truck fleets, a tubeless tire mounted on rim 5 is carefully inflated using a type of tire inflator now in common use that inflates a tire to a selected pressure to the pressure desired by the fleet operator. If a driver of the vehicle on which the tire is mounted attempts to partially deflate the tire by the usual manner of removing cap 15 and pressing the deflator pin in the valve in the threaded end of barrel 11 the movement of air from a tire being deflated through chamber 35 of housing 32 causes disk 31 to flutter against valve base 12 and prevent exit of air from the tire by disk 31 closing said entrance 36. If said driver of the vehicle endeavors to open valve 30 to permit deflation of the tire by removing the said valve insides to gain access to valve 30, as for example, by passing a wire or elongated object such as 40 into valve 30 as shown in Fig. 6, the housing 32 prevents displacement of disk 31 from its sealing contact with base 12. Disk 31 being of rubber or rubbery-like material will be pressed, by an object such as a wire 40, from contact with base 12 immediately about the entrance 36 to passage 37 but the internal air pressure in chamber 35 will hold the edge portion of disk 31 firmly against base 12 in air-tight contact therewith whereby such unauthorized attempts to deflate the tire is defeated.

The only way to deflate the tire without mutilating valve 30 is to loosen nut 21 and press barrel 11 through valve hole 6 until gaskets 16 and 19 are loosened enough to permit the escape of air through the rim valve hole. Deflating by this method is done by the fleet operator in a service terminal or garage when a tire is to be replaced or repaired. While such deflation is a simple matter as garage operation and where complete deflation is to be done to demount the tire it is sufficiently involved to completely discourage a roadside attempt to so deflate. It is further pointed out that when deflation is done by loosening nut 21 as just described, the amount of deflation cannot be accurately controlled and washers 16 and 19 may require replacement in order to provide an airtight seal. It has been found that drivers will not tamper with valves embodying the present invention and tire cost of operating fleets of vehicles mentioned hereinabove is substantially reduced.

The detailed description of the particular embodiment of the invention illustrated and described herein is not to be construed as limiting the invention thereto. It is to be understood that the invention is useful with any type of valve used with tubeless tires whenever the valve 30 may be incorporated therewith. The invention includes all features of patentable novelty residing in the foregoing description and the accompanying drawings.

I claim:

A tamper-proof valve for admitting inflationary air into a pneumatic tire and retaining it therein, said valve comprising a valve stem having a central passage extending longitudinally therethrough, an annular seat disposed about one end of said passage and having an outer diameter at least four times greater than the diameter of said passage, an imperforate disc positioned adjacent said seat and closing said inner end of said passage when in contact with said seat, a support having a portion holding said disc against lateral displacement away from said seat and having a second portion spaced from said seat a distance approximately twice the thickness of the disc, thereby permitting said disc to move axially away from said seat under the force of inrushing air under pressure in said central passage and to move against said seat to close off said passage in response to the pressure of the air acting in the opposite direction, said disc being of flexible material and having a diameter corresponding to the diameter of said seat to permit the central portion of said disc to be displaced axially from the inner end of said passage into contact with said second support portion while the outer annular portion of said flexible disc retains sealing contact with said seat.

References Cited in the file of this patent

UNITED STATES PATENTS

| | | |
|---|---|---|
| 1,469,966 | Schweinert | Oct. 9, 1923 |
| 1,797,280 | Zerk | Mar. 24, 1931 |
| 2,587,470 | Herzegh | Feb. 26, 1952 |
| 2,685,907 | Waddell | Aug. 10, 1954 |

FOREIGN PATENTS

| | | |
|---|---|---|
| 968,435 | France | Apr. 19, 1950 |
| 975,788 | France | Oct. 17, 1950 |